United States Patent
Kannan et al.

(10) Patent No.: US 11,144,569 B2
(45) Date of Patent: Oct. 12, 2021

(54) OPERATIONS TO TRANSFORM DATASET TO INTENT

(71) Applicant: International Business Machines Corporation, Armonk, NY (US)

(72) Inventors: Kalapriya Kannan, Bangalore (IN); Sameep Mehta, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 213 days.

(21) Appl. No.: 16/412,115

(22) Filed: May 14, 2019

(65) Prior Publication Data

US 2020/0364235 A1 Nov. 19, 2020

(51) Int. Cl.
  *G06F 16/25* (2019.01)
  *G06F 40/30* (2020.01)
(52) U.S. Cl.
  CPC .......... *G06F 16/258* (2019.01); *G06F 40/30* (2020.01)
(58) Field of Classification Search
  CPC .......................... G06F 16/258; G06F 40/30
  See application file for complete search history.

(56) References Cited

U.S. PATENT DOCUMENTS

| | | |
|---|---|---|
| 8,782,542 B2 | 7/2014 | Erl |
| 2004/0176988 A1 | 9/2004 | Boughannam |
| 2016/0259626 A1 | 9/2016 | Thattai et al. |
| 2016/0285962 A1 | 9/2016 | Byrne et al. |
| 2020/0327252 A1* | 10/2020 | Mcfall ............... G06F 21/602 |

FOREIGN PATENT DOCUMENTS

WO  WO2014130371 A1  8/2014

OTHER PUBLICATIONS

S. Prasath Sivasubramanian et al., "Dynamic Web Service Composition: Challenges and Techniques", 2009, 8 pages, IEEE Digital Library.
Raluca Jordache et al., A web service composition approach based on QoS preferences (Short paper), 6th International Conference on Service-Oriented Computing and Applications, 2013, 5 pages, IEEE Digital Library.
Demian Antony D'Mello et al., "A Review of Dynamic Web Service Composition Techniques", CCSIT, 2011, 13 pages, Part III, Springer-Verlag, Berlin, Heidelberg.

* cited by examiner

*Primary Examiner* — Truong V Vo
(74) *Attorney, Agent, or Firm* — Ference & Associates LLC (57) ABSTRACT

One embodiment provides a method, including: receiving, from a user, (i) a dataset and (ii) an intended output from the dataset that is generated in view of a given analytical framework for the dataset, wherein the intended output identifies an output that the user wants from the dataset and wherein the dataset is related to an analytical domain; identifying a plurality of dataset functions related to the analytical domain; determining one or more dataset functions for each of one or more operations identified, wherein the one or more operations are identified using the repository to identify operations used to result in an intended output similar to the received intended output; and recommending an ordered subset of the one or more dataset functions to be used to transform the dataset to the intended output, wherein the ordered subset comprises (i) one dataset function for each of the one or more operations and (ii) an order for performing the one or more operations.

20 Claims, 3 Drawing Sheets

OPERATIONS TO TRANSFORM DATASET TO INTENT

BACKGROUND

Many users have datasets that they wish to perform different operations on. For example, a user may want to have a particular prediction or analysis performed with respect to a large dataset. To get to this prediction or analysis, different functions or operations must be performed on the dataset in order to transform it from the input dataset to the desired output. Functional compositions are used in order to transform a dataset into a desired output by a user. Functional compositions are a series of smaller, simpler functions or operations that are put together in a series in order to perform the more complex overall desired transformation. Each step in the transformation of the dataset to the desired output could be performed using more than one operation. In other words, for each step in the transformation there may be many different operations that could be used to perform a single step. Additionally, different series of operations can be put together in order to perform the overall transformation. In other words, the overall transformation could be broken up into different steps, thereby allowing for a different series of operations that would result in the same desired output.

BRIEF SUMMARY

In summary, one aspect of the invention provides a method, comprising: receiving, from a user, (i) a dataset and (ii) an intended output from the dataset that is generated in view of a given analytical framework for the dataset, wherein the intended output identifies an output that the user wants from the dataset and wherein the dataset is related to an analytical domain; identifying, from a repository of dataset functions corresponding to operations historically executed on datasets, a plurality of dataset functions related to the analytical domain; determining, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and recommending an ordered subset of the one or more dataset functions to be used to transform the dataset to the intended output, wherein the ordered subset comprises (i) one dataset function for each of the one or more operations and (ii) an order for performing the one or more operations.

Another aspect of the invention provides an apparatus, comprising: at least one processor; and a computer readable storage medium having computer readable program code embodied therewith and executable by the at least one processor, the computer readable program code comprising: computer readable program code configured to receive, from a user, (i) a dataset and (ii) an intended output from the dataset that is generated in view of a given analytical framework for the dataset, wherein the intended output identifies an output that the user wants from the dataset and wherein the dataset is related to an analytical domain; computer readable program code configured to identify, from a repository of dataset functions corresponding to operations historically executed on datasets, a plurality of dataset functions related to the analytical domain; computer readable program code configured to determine, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and computer readable program code configured to recommend an ordered subset of the one or more dataset functions to be used to transform the dataset to the intended output, wherein the ordered subset comprises (i) one dataset function for each of the one or more operations and (ii) an order for performing the one or more operations.

An additional aspect of the invention provides a computer program product, comprising: a computer readable storage medium having computer readable program code embodied therewith, the computer readable program code executable by a processor and comprising: computer readable program code configured to receive, from a user, (i) a dataset and (ii) an intended output from the dataset that is generated in view of a given analytical framework for the dataset, wherein the intended output identifies an output that the user wants from the dataset and wherein the dataset is related to an analytical domain; computer readable program code configured to identify, from a repository of dataset functions corresponding to operations historically executed on datasets, a plurality of dataset functions related to the analytical domain; computer readable program code configured to determine, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and computer readable program code configured to recommend an ordered subset of the one or more dataset functions to be used to transform the dataset to the intended output, wherein the ordered subset comprises (i) one dataset function for each of the one or more operations and (ii) an order for performing the one or more operations.

A further aspect of the invention provides a method, comprising: receiving, from a user, (i) a dataset corresponding to a domain and (ii) a desired output that can be produced from the dataset; identifying, from a database storing (i) a plurality of historical datasets and (ii) a series of operations corresponding to each of the plurality of historical datasets, a subset of the historical datasets related to the domain of the dataset, wherein the series of operations indicating a plurality of operations performed on the historical datasets to transform the historical datasets into an identified output; deriving, from the subset of historical datasets, a plurality of operations to transform the dataset to the output, wherein the deriving comprises (i) matching the desired output to an output of one of the series of operations to identify an input of the one of the series of operations and (ii) iteratively matching the input of an identified one of the series of operations to an output of another of the one of the series of operations until the input of the series of operations matches the dataset; and recommending, from the derived plurality of operations, a series of operations to a user for transforming the dataset to the desired output.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Users may have a dataset and a desired analytical intent with respect to the dataset. The analytical intent is the output that is desired by the user with regard to the dataset. For example, the user may want a particular prediction made with respect to the dataset, a particular analysis performed with respect to the dataset, and the like. Since these datasets include large amounts of data and the analytical intents are generally complex, many transformations of datasets to the desired output or analytical intent are performed using a functional composition. A functional composition is a set of smaller, simpler operations or functions, each used to perform one step in the transformation process, that are put together in a series to produce the overall, more complex transformation. An advantage to using functional compositions is that smaller, simpler operations can be developed and used across many different datasets. However, if a single operation is developed for a particular dataset and analytical intent, the ability to use this single operation for a different dataset is greatly reduced.

However, in order to use a functional composition to transform a dataset into a desired output or analytical intent, a user must select a series of smaller functions or operations that are put together in a functional composition to perform the more complex operation. It may be difficult for a user to identify which functions to include in the functional composition. Rather, in order to identify which functions to include in the functional composition, the user must have an understanding of what steps would be involved in transforming the dataset to the analytical intent. In other words, the user must be able to identify a series of steps that could be used to transform the dataset to the analytical intent and then choose a function for each of these identified steps. Not only is identification of which steps would be necessary for transforming the dataset to the analytical intent difficult, but also identifying which functions could be used during each step may be difficult. This is because there may be many different operations that could be used for a single step and it may be difficult to discern which of these operations would be a best fit for the identified step with respect to the dataset and the analytical intent.

Currently there is no conventional technique for recommending operations for single steps of a transformation, let alone recommending an entire functional composition for the complex transformation. At best, the repositories storing the functions or operations may include short descriptions for each of the functions or operations that describe the purpose of the function and identify an output that would result from the application of the function. However, the user still must identify the steps that are necessary for the overall transformation and then select the operation for each step.

Accordingly, an embodiment provides a system and method for identifying and recommending a series of operations identified from a repository of historical datasets and operations to transform a received dataset into a desired analytical intent. The system receives the dataset and analytical intent, or intended output, from the user. The system identifies different attributes regarding the dataset, for example, the analytical space or domain, the type of information included in the dataset (e.g., structured data, unstructured data, data formats, etc.), the semantics of the dataset, and the like. The system can access one or more repositories that include many different dataset functions that correspond to operations that were historically executed on datasets. In other words, the dataset functions or operations are functions or operations that have previously been executed on previous datasets. From the repositories the system can identify one or more dataset functions that are related to or correspond to the identified attributes of the dataset and/or analytical intent, for example, one or more dataset functions that are related to the analytical domain or space.

From these identified dataset functions, the system can determine one or more dataset functions for each of a plurality of operations or steps required to transform the dataset to the analytical intent. To determine or identify the operations or steps required to transform the dataset, the system uses the repository to identify operations that were executed on historical datasets related to the analytical domain and that resulted in analytical intents that are similar to the received analytical intent. The system can match metadata or metatags that are associated with each of the operations to obtain the desired intent. The metadata or metatags may identify the input requirements for each of the operations and also identify the semantics of the outputs from the operations. The system can then use reverse matching to match operations to the dataset and analytical intent to recommend an ordered subset of the dataset functions. For example, the system can match an operation having an output matching the analytical intent and identify the input required for that operation. The system then matches this input to an output of another operation. The system iteratively performs this matching of inputs of operations to outputs of other operations until an operation having an input matching the dataset is identified. The system can then provide a recommendation of this series of operations to the user that would result in the overall desired transformation.

Such a system provides a technical improvement over current systems for identifying functional compositions for dataset transformations, by providing a system that can recommend an ordered series of operations to include in the functional composition. Traditional techniques require a user to identify the specific steps necessary for performing the transformation from a dataset to an analytical intent and then identify operations for each of these steps. The described system and method are able to automatically identify the different steps that could be used to transform the dataset to the analytical intent by accessing a repository of historical datasets and operations. Based upon this identification, the system can automatically identify operations that could be used for each step. Thus, the described system and method provides a technique that can automatically provide a recommendation of operations for a transformation without requiring a large amount of user knowledge and/or user intervention as required by the conventional techniques.

Figure 1:
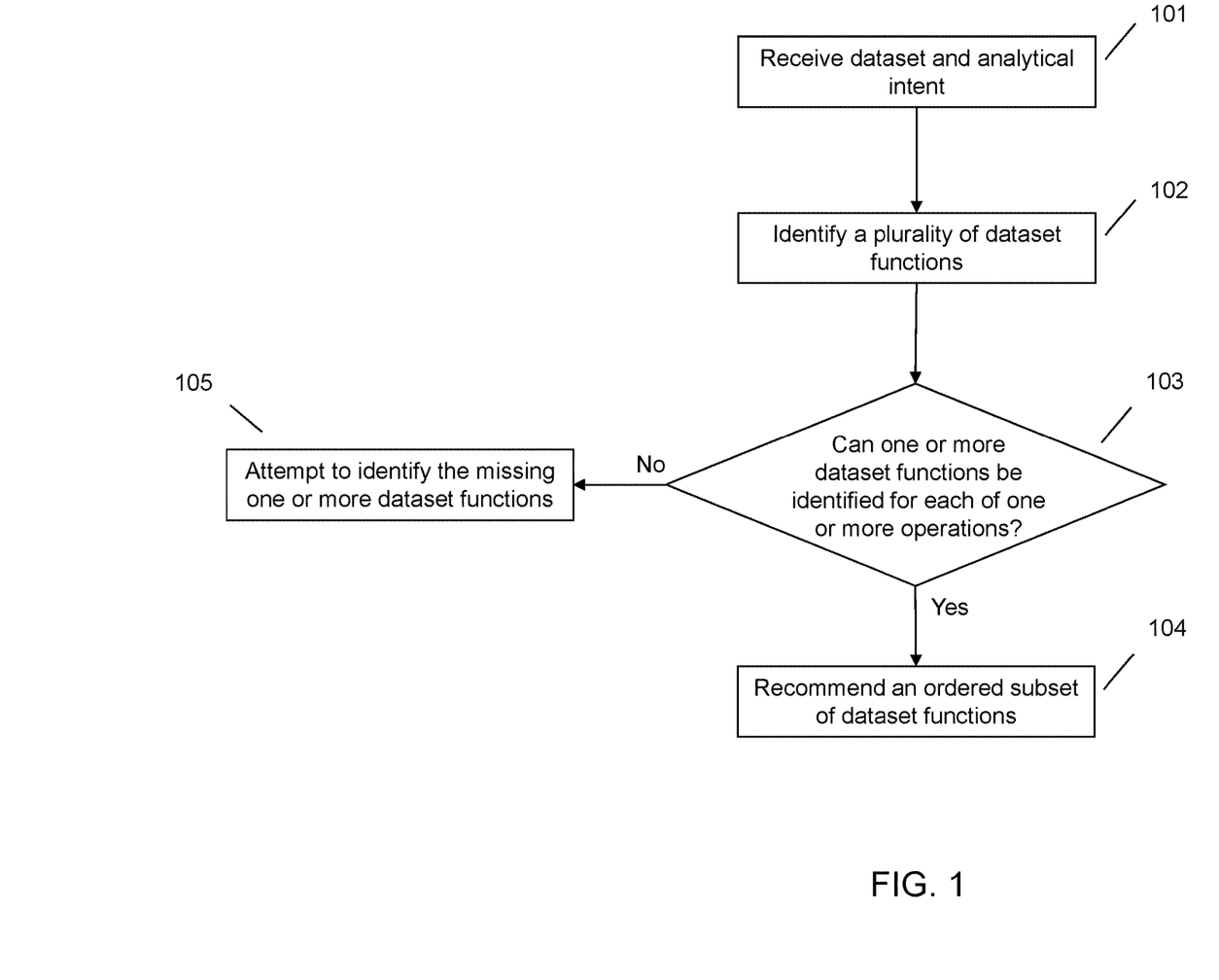
FIG. 1 illustrates a method of recommending a series of operations identified from a repository of historical datasets and operations to transform a received dataset into a desired analytical intent.

FIG. 1 illustrates a method for recommending a series of operations identified from a repository of historical datasets and operations to transform a received dataset into a desired analytical intent. At 101 the system receives both a dataset and an analytical intent for the dataset from a user. The analytical intent identifies a desired or intended output that the user wants from the dataset that is generated in view of a given analytical framework. In other words, the analytical intent identifies an overall operation that the user wants to perform on the dataset. For example, the user may identify a particular prediction with regard to the dataset, a particular analysis with regard to the dataset, or the like, that the user would like to know or understand with respect to the dataset. As more specific examples, the user may want a sentiment analysis performed on the dataset, the user may want to understand if a correlation exists between certain attributes of the dataset and outputs provided by the dataset, the user may want to predict an equipment output using the dataset, or the like. In identifying the analytical intent or desired output, the user may provide textual tags that identify the desired analytical intent. The textual tags may simply be text that identifies the analytical intent. Additionally, or alternatively, the analytical intent may be provided as sample output. For example, a user may provide a sample output that includes metadata or tags that identify the data schema and the intent of each output. In other words, the user provides a sample output of the dataset and then tags each of the components of the output with tags that identify the data schema of the output component and the intent of the output component. The user may also provide metadata that identify correlations between different portions of the sample output.

The dataset may be related to an analytical domain or space. For example, the dataset may be related to an equipment domain, a mortgage lending domain, a user information domain, or the like. The analytical domain or space may identify an overarching theme or field of the dataset. The dataset can be provided in many different formats and/or may include many different data types. For example, the dataset may include both structured and unstructured data. Structured data are data that are in an identified format corresponding to a particular data attribute. For example, structured data may include data that were provided into fields in a form with each field having a specific structure and description. In other words, data in a structured format have a known format and also a known description corresponding to each field. Unstructured data, on the other hand, are data having no identified structure. For example, unstructured data may include free-form text or text provided using a natural language format. The dataset may also include combinations of data, for example, both structured and unstructured data, data in different formats or types, or the like.

Thus, from the dataset the system may identify different attributes of the dataset. For example, the system may identify the data format (e.g., integer, float, currency, etc.), whether the data are structured or unstructured, and the like. The system may also identify semantic information related to the dataset. For example, in the case that the data includes structured information, the system may identify a column header for each of the data columns and then identify a semantic meaning of the column header. As another example, in the case that the data includes unstructured information, the system can parse and analyze the unstructured data, for example, using a natural language analysis technique, and then use a semantic analysis technique to identify the semantics associated with the unstructured data. Accordingly, the system outputs a set of information identifying the format of the dataset and the semantic information associated with the dataset.

At 102 the system identifies a plurality of dataset functions related to the analytical domain of the received or target dataset. These dataset functions are stored in one or more data repositories or data storage locations. Each repository may include datasets, also referred to as historical datasets for ease of readability, and operations corresponding to these historical datasets. The operations may include those operations that were performed on the historical dataset to transform or convert the historical dataset from an input dataset to an analytical intent or particular output. The operations may correspond to dataset functions which are the functions that were used to perform the corresponding operation. From all the dataset functions included in the repository or repositories, the system identifies which dataset functions are related to the analytical domain or space of the target dataset.

To identify the analytical space or domain of the dataset functions, the system may access metatags associated with the dataset functions. The metatags may include information that identifies different attributes of a dataset function. In this case, the metatags may identify the analytical domain or space of the dataset function. The metatags may also include information related to the input requirements of the dataset function, formats or semantics of outputs of the dataset function, a data schema associated with the dataset function, and the like. The metatags may be created by a user and the associated with the dataset function. Additionally, or alternatively, the system can create the metatags by analyzing the dataset function and/or dataset to determine the information to be included in the metatag. The system can also employ one or more machine learning techniques to perform type inference and data structure to generate one or more metatags. For example, to identify a data structure the system may employ a machine learning technique to identify structural patterns of the target and/or historical datasets.

The system then determines whether, from the set of dataset functions that correspond to the analytical space, one or more dataset functions for each of a series of operations that need to be performed on the target dataset to result in the target analytical intent can be determined or identified at 103. To make this determination, the system determines which of the historical dataset functions match the target dataset and/or target analytical intent. The system accesses historical execution information for the historical datasets to identify the operations that were performed on the historical dataset to transform or convert the historical dataset to the historical output corresponding to the historical dataset. This allows the system to generate a lineage for each of these historical datasets. With the lineage generation, the system also generates metadata to generate the metatags. The metatags identify the input requirements for the function and the format and semantic information for the output of the function. Alternatively, if the lineage has already been generated and provided with metatags, the system may simply access the lineage and corresponding metatags.

Using the lineage and metatags, the system can identify dataset functions that may match different operations that may be used to transform or convert the target dataset to the target analytical intent. Through this matching the system also identifies what operations need to be performed in order to convert the target dataset to the target analytical intent. In other words, the system can use the historical information contained within the repository to identify one or more operations or dataset functions that were executed on the historical dataset to result in an analytical intent similar to the target analytical intent.

The matching is performed using a recursive or iterative reverse matching technique. First, using the information contained in the metatags, for example, the information related to the output of the dataset function, the system can identify one or more dataset functions that resulted in an analytical intent similar to the target analytical intent. Determining a similarity of analytical intents may be performed using a similarity technique, for example, by identifying a similarity distance between the target analytical intent and the historical analytical intent. As another example, the system can use a natural language processing and analysis technique to determine a semantic similarity between the semantics of the output of the target analytical intent and the semantics of the historical analytic intent.

After one or more dataset functions are identified that provide the desired output, the system looks at the input for each of these dataset functions. The system then identifies another dataset function that results in an output that matches the input of dataset function. In other words, if historical dataset functions A, B, and C all have outputs matching the target analytical intent, the system looks at the input requirements (identified from the metatags) for historical dataset functions A, B, and C. The system then identifies historical dataset functions that have outputs matching the input requirements of historical dataset functions A, B, and C. The system performs this iterative reverse matching analysis until the input of the historical dataset function matches the target dataset. In other words, the system keeps matching input requirements to outputs of dataset functions until the input requirement matches the target dataset. Not only does this result in an identification of dataset functions that could be used for each operation necessary for transforming the target dataset to the target analytical intent, but it also identifies what operations are necessary for performing the transformation or conversion.

If, at 103, the system cannot identify one or more dataset functions for one or more of the operations, the system may attempt to identify the missing one or more dataset functions at 105. This may include determining that the operation should not be included in the transformation of the target dataset to the analytical intent and discarding any dataset functions that have been identified using this particular operation series thus far. Alternatively, the system may access one or more other repositories to determine if those repositories may include a dataset function that fits with the operation.

If, however, one or more dataset functions for each of the operations can be identified at 103, the system may recommend an ordered subset of the one or more dataset functions at 104. The ordered subset may include an identification of the order in which the dataset functions should be executed in order to perform the desired transformation. This order is identified based upon the recursive reverse matching. In other words, the order of the dataset functions is based upon what order was identified from the reverse matching, specifically, the dataset functions having matching input requirements and outputs.

Additionally, since for each operation necessary for transforming the target dataset to the target analytical intent more than dataset function may accurately and correctly perform the operation, the ordered subset may include a recommendation of a dataset function from the one or more dataset functions to be used for a particular operation. To select or recommend a single dataset function for an operation, the system may identify which dataset function best fits the target dataset and/or target analytical intent with respect to the operation. Thus, the system may rank the dataset functions identified for each operation. The ranking may include identifying a similarity of the output semantics to the semantics of the target dataset. Dataset functions having a higher similarity may be ranked higher than dataset functions having a lower semantic similarity. Thus, the system may recommend the dataset function having the highest ranking or semantic similarity.

Figure 2:
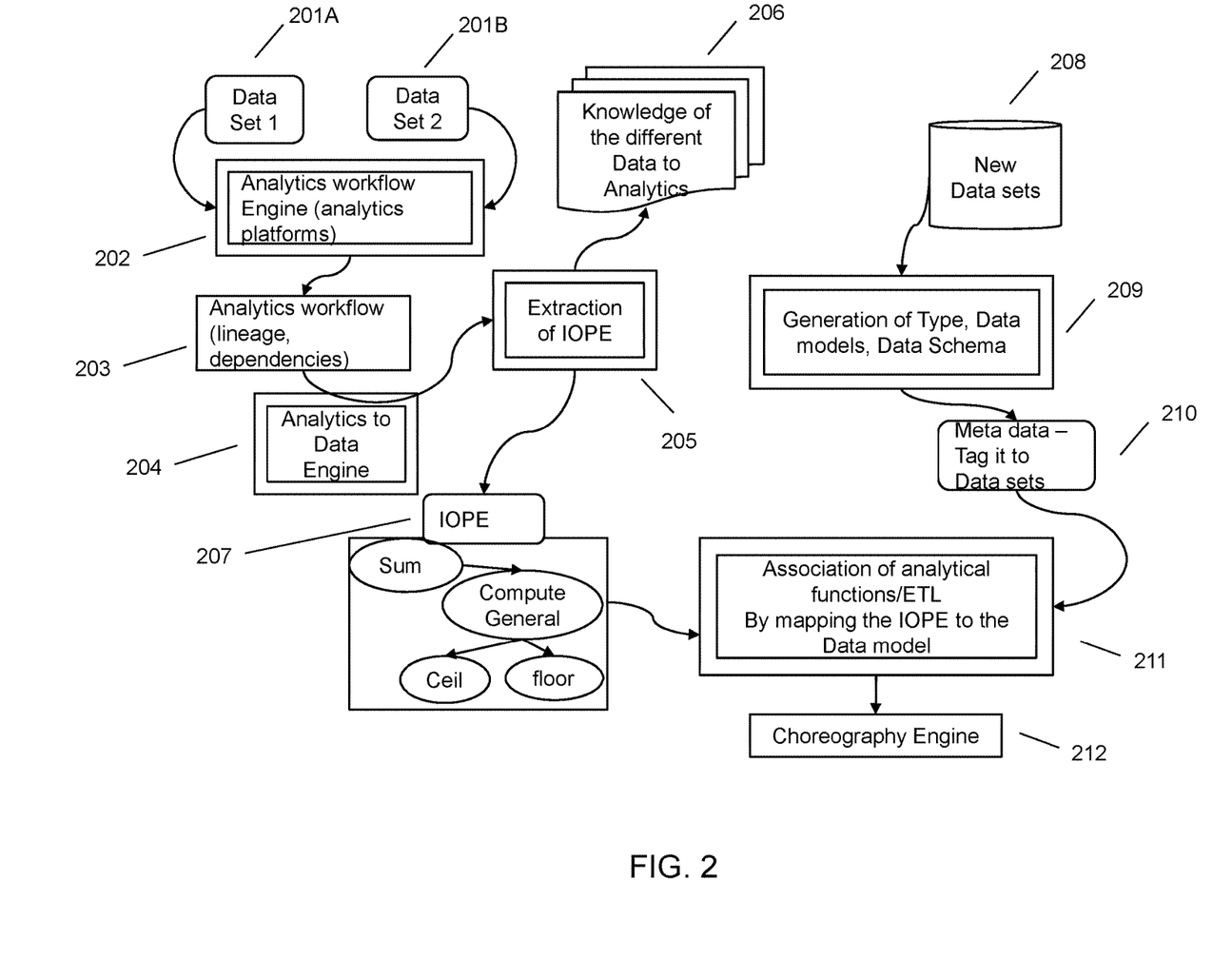
FIG. 2 illustrates an example system architecture for recommending a series of operations identified from a repository of historical datasets and operations to transform a received dataset into a desired analytical intent.

FIG. 2 represents an overall architecture and flow of the described system and method. For the repositories storing the historical datasets and/or operations, the system receives or obtains the historical datasets 201A and 201B. The repositories include an analytics workflow engine 202 that is able to generate an analytics workflow 203, including the lineage, operation dependencies, and the like. The analytics workflow information can be fed to a data engine 204 that can extract the input requirements, output format and/or semantics, and effects (IOPE) and tag them with metadata 205. The extracted IOPE 205 can be provided to correlate the datasets to the analytics or analytical intent 206. The extracted IOPE 205 is also stored 207.

For the target dataset 208 the system generates and/or identifies the data format types, data models, data schemas, and the like, 209. The system then tags the dataset with the metadata in the form of metatags 210. The system can then identify dataset function from the historical datasets by associating the metatags of the target dataset with the metatags (IOPE) 207 of the historical datasets at 211. In other words, the system includes a mapper 211 that maps the IOPE of the historical datasets 207 to the data models and/or metatags of the target dataset 210. The system then employs the choreography engine 212 that performs the recursive reverse matching to recommend an ordered set of dataset functions for transforming or converting the target dataset to the target analytical intent.

Thus, the described systems and methods represent a technical improvement over current systems for identifying functional compositions for transforming datasets to analytical intents. The conventional techniques require a user to identify the steps necessary for transforming a dataset to an analytical intent or desired output. The user then has to identify which operations should be used for each of these transformation steps. The described system and method, on the other hand, can automatically identify the required steps and operations for each of the identified steps by accessing repositories of historical datasets and operations executed on the datasets. By matching inputs and outputs of different operations to the target dataset and desired output, the system can automatically generate an ordered series of operations that would result in the desired transformation. Thus, the described system and method provide a technique that reduces the user required knowledge regarding different transformations and user time needed for choosing the best fit of operations to transform a dataset to an analytical intent.

Figure 3:
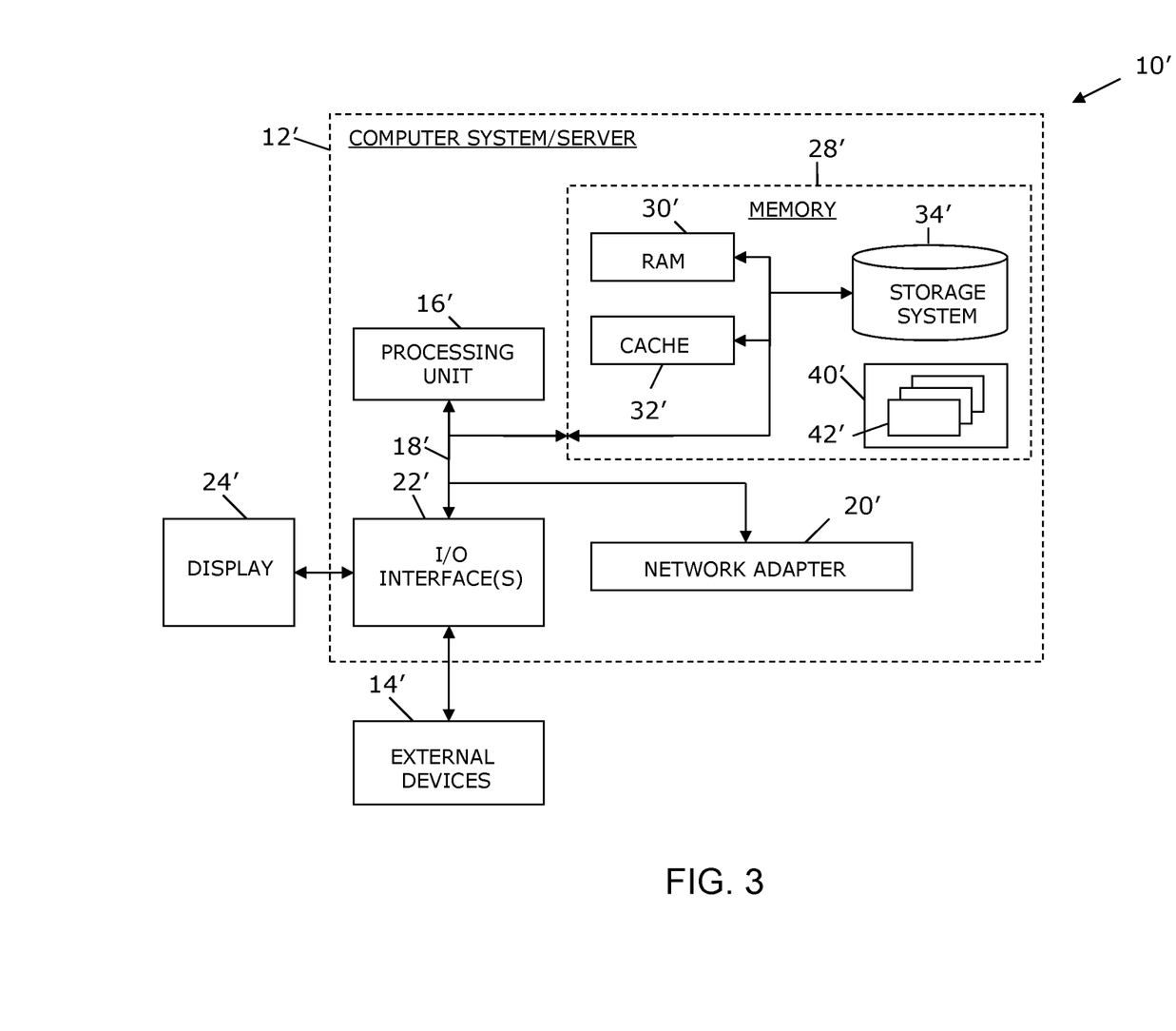
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, from a user, (i) a dataset and (ii) an intended output from the dataset that is generated in view of a given analytical framework for the dataset, wherein the intended output identifies an output that the user wants from the dataset and wherein the dataset is related to an analytical domain, wherein the intended output identifies an operation to be performed on the dataset;
identifying, from a repository of dataset functions corresponding to operations historically executed on datasets, a plurality of dataset functions related to the analytical domain, wherein the operations historically executed on datasets identify an output of a transformation corresponding to the operation, wherein the identifying comprises accessing metatags identifying attributes of the dataset functions and being associated with the dataset functions;
determining, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and
recommending an ordered subset of the one or more dataset functions to be used to transform the dataset to the intended output, wherein the ordered subset comprises (i) one dataset function for each of the one or more operations and (ii) an order for performing the one or more operations.

2. The method of claim 1, comprising identifying (i) a format of the dataset and (ii) semantic information of the dataset.

3. The method of claim 2, wherein the recommending comprises ranking the one or more dataset functions for each of the one or more operations, wherein a dataset function having a semantic similarity more similar to a semantic of the dataset is ranked higher than a dataset function having a semantic similarity less similar to a semantic of the dataset.

4. The method of claim 3, wherein the recommending comprises recommending a dataset function having the highest ranking for each of the one or more operations.

5. The method of claim 1, wherein to identify operations comprises accessing a lineage, for at least a portion of the historical datasets related to the analytical domain, the lineage indicating operations executed on the historical datasets related to the analytical domain.

6. The method of claim 5, wherein the lineage is tagged with metatags indicating (i) semantics of the output of each of the operations and (ii) input requirements of each of the operations.

7. The method of claim 1, wherein the determining one or more dataset functions comprises identifying, for each of the one or more operations, a dataset function having an output matching the output of the one or more operations.

8. The method of claim 7, wherein the determining one or more dataset functions comprises, once a dataset function having an output matching the output of the one or more operations is identified, identifying a dataset function having an input matching an output of a previous one or more operation.

9. The method of claim 8, wherein the order for performing the one or more operations is determined via the matching of inputs of one or more operations to the outputs of one or more operations.

10. The method of claim 1, wherein the receiving the intended output comprises receiving a sample output indicating the output that the user wants from the dataset.

11. An apparatus, comprising:
at least one processor; and
a computer readable storage medium having computer readable program code embodied therewith and executable by the at least one processor, the computer readable program code comprising:
computer readable program code configured to receive, from a user, (i) a dataset and (ii) an intended output from the dataset that is generated in view of a given analytical framework for the dataset, wherein the intended output identifies an output that the user wants from the dataset and wherein the dataset is related to an analytical domain, wherein the intended output identifies an operation to be performed on the dataset;
computer readable program code configured to identify, from a repository of dataset functions corresponding to operations historically executed on datasets, a plurality of dataset functions related to the analytical domain, wherein the operations historically executed on datasets identify an output of a transformation corresponding to the operation, wherein the identifying comprises accessing metatags identifying attributes of the dataset functions and being associated with the dataset functions;
computer readable program code configured to determine, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and
computer readable program code configured to recommend an ordered subset of the one or more dataset functions to be used to transform the dataset to the intended output, wherein the ordered subset comprises (i) one dataset function for each of the one or more operations and (ii) an order for performing the one or more operations.

12. A computer program product, comprising:
a computer readable storage medium having computer readable program code embodied therewith, the computer readable program code executable by a processor and comprising:
computer readable program code configured to receive, from a user, (i) a dataset and (ii) an intended output from the dataset that is generated in view of a given analytical framework for the dataset, wherein the intended output identifies an output that the user wants from the dataset and wherein the dataset is related to an analytical domain, wherein the intended output identifies an operation to be performed on the dataset;
computer readable program code configured to identify, from a repository of dataset functions corresponding to operations historically executed on datasets, a plurality of dataset functions related to the analytical domain, wherein the operations historically executed on datasets identify an output of a transformation corresponding to the operation, wherein the identifying comprises accessing metatags identifying attributes of the dataset functions and being associated with the dataset functions;

computer readable program code configured to determine, from the plurality of dataset functions, one or more dataset functions for each of one or more operations identified to transform the dataset to the intended output, wherein the one or more operations are identified using the repository to identify operations, executed on historical datasets related to the analytical domain, used to result in an intended output similar to the received intended output; and computer readable program code configured to recommend an ordered subset of the one or more dataset functions to be used to transform the dataset to the intended output, wherein the ordered subset comprises (i) one dataset function for each of the one or more operations and (ii) an order for performing the one or more operations.

13. The computer program product of claim 12, comprising identifying (i) a format of the dataset and (ii) semantic information of the dataset.

14. The computer program product of claim 13, wherein the recommending comprises ranking the one or more dataset functions for each of the one or more operations, wherein a dataset function having a semantic similarity more similar to a semantic of the dataset is ranked higher than a dataset function having a semantic similarity less similar to a semantic of the dataset.

15. The computer program product of claim 12, wherein to identify operations comprises accessing a lineage, for at least a portion of the historical datasets related to the analytical domain, the lineage indicating operations executed on the historical datasets related to the analytical domain.

16. The computer program product of claim 12, wherein the determining one or more dataset functions comprises identifying, for each of the one or more operations, a dataset function having an output matching the output of the one or more operations.

17. The computer program product of claim 16, wherein the determining one or more dataset functions comprises, once a dataset function having an output matching the output of the one or more operations is identified, identifying a dataset function having an input matching an output of a previous one or more operation.

18. The computer program product of claim 17, wherein the order for performing the one or more operations is determined via the matching of inputs of one or more operations to the outputs of one or more operations.

19. The computer program product of claim 12, wherein the receiving the intended output comprises receiving a sample output indicating the output that the user wants from the dataset.

20. A method, comprising:

receiving, from a user, (i) a dataset corresponding to a domain and (ii) a desired output that can be produced from the dataset, wherein the desired output identifies an operation to be performed on the dataset;

identifying, from a database storing (i) a plurality of historical datasets and (ii) a series of operations corresponding to each of the plurality of historical datasets, a subset of the historical datasets related to the domain of the dataset, wherein the series of operations indicate a plurality of operations performed on the historical datasets to transform the historical datasets into an identified output, wherein the identifying comprises accessing metatags identifying attributes of the plurality of operations and being associated with the plurality of operations;

deriving, from the subset of historical datasets, a plurality of operations to transform the dataset to the output, wherein the deriving comprises (i) matching the desired output to an output of one of the series of operations to identify an input of the one of the series of operations and (ii) iteratively matching the input of an identified one of the series of operations to an output of another of the one of the series of operations until the input of the series of operations matches the dataset; and recommending, from the derived plurality of operations, a series of operations to a user for transforming the dataset to the desired output.

* * * * *